No. 685,302. Patented Oct. 29, 1901.
A. SIDOTI.
STRAINER.
(Application filed Apr. 9, 1900.)
(No Model.)
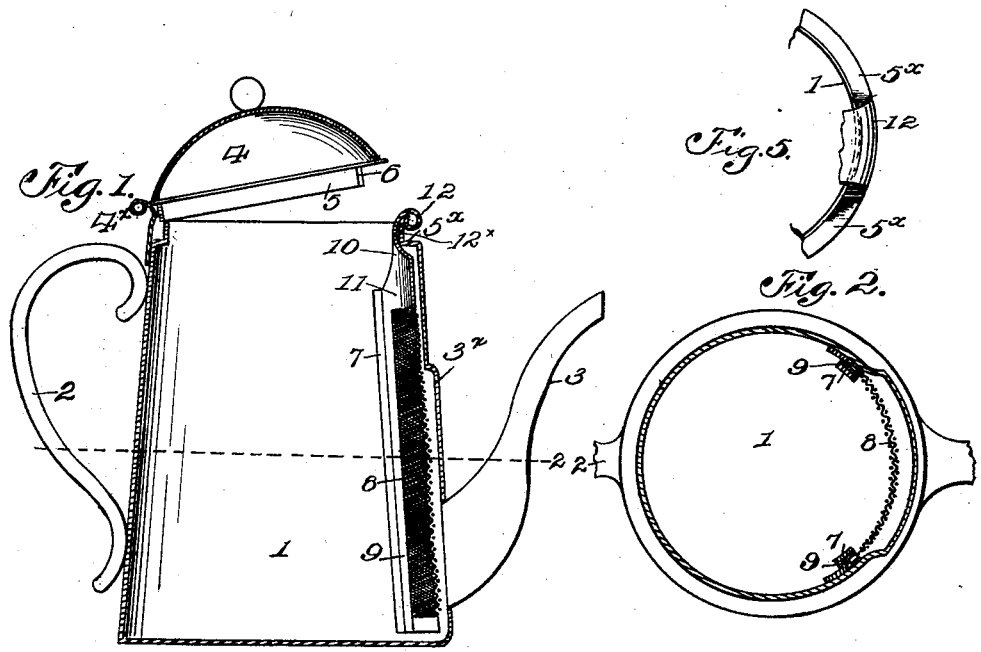
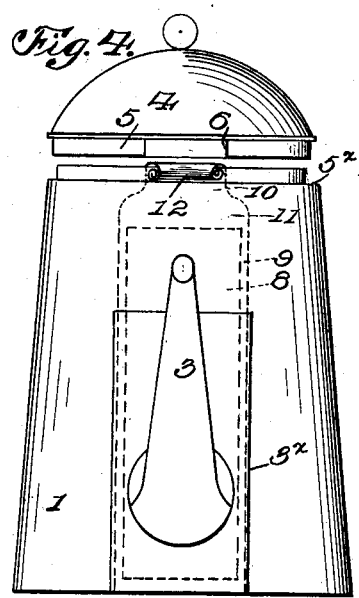
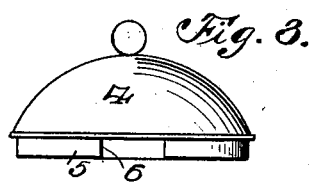
Witnesses
David W. Gould.
CM Catlin
Inventor
Antonio Sidoti,
by Benj. R. Catlin
Attorney
THE NORRIS PETERS CO., PHOTO-LITHO., WASHINGTON, D. C.

UNITED STATES PATENT OFFICE.

ANTONIO SIDOTI, OF DALLAS, TEXAS.

STRAINER.

SPECIFICATION forming part of Letters Patent No. 685,302, dated October 29, 1901.

Application filed April 9, 1900. Serial No. 12,131. (No model.)

*To all whom it may concern:*

Be it known that I, ANTONIO SIDOTI, a resident of Dallas, in the county of Dallas and State of Texas, have invented certain new and useful Improvements in Strainers; and I do hereby declare the following to be a full, clear, and exact description of the invention, such as will enable others skilled in the art to which it pertains to make and use the same.

The invention relates to strainers for culinary and other vessels and is well adapted for tea or coffee pots. Its object is to provide a simple and efficient strainer adapted for a detachable connection to a vessel; and the invention consists in the construction herein described and pointed out.

In the accompanying drawings, Figure 1 is a longitudinal section of a coffee-pot with the strainer operatively situated therein, the cover being represented as partially removed. Fig. 2 is a section on line 2 2 of Fig. 1. Fig. 3 is an elevation of the pot-cover. Fig. 4 is a front elevation, the cover being raised and a strainer indicated by broken lines. Fig. 5 is a broken plan illustrating the strainer-handle coil in position on the vessel.

Numeral 1 denotes any suitable vessel, a coffee-pot being indicated in the present instance. 2 indicates its handle, and 3 its pouring-spout.

$3^\times$ denotes a recess which may be formed in the vessel-wall, if desired.

4 denotes a cover, and $4^\times$ is a spring-catch. A hinge may be used, if desired.

The rim 5 of the cover, which fits the mouth of the vessel above a shoulder $5^\times$, is cut away at 6, as indicated. Said shoulder is formed by insetting the mouth or rim of the vessel, as indicated. This inset provides a recess for a strainer-handle, to be described.

7 denotes flanges secured to the interior of the vessel and suitably disposed to receive the edges of a wire or other strainer 8.

9 indicates a binding holding the edges of the strainer material. This binding at the side edges of the strainer is adapted to slide in ways behind the flanges 7 when the strainer is inserted or removed from the vessel. At the upper end of the strainer the binding is prolonged, and a part 10, extended beyond the other part 11, is narrowed and coiled, as indicated at 12. The part 11 is preferably convex to fit the vessel-wall on its interior. The coil 12 may have a reverse convexity to fit the convexity of the vessel-mouth and fill the opening 6 in the cover-flange. The coil serves as a handle for the manipulation of the strainer and also as a lock or catch to secure it in operative position, and it is itself held in place by the cover. The construction is such that the coil and the edge of the cover can be manipulated by the fingers either separately or simultaneously.

The strainer can be removed for cleaning or for drying. It can also be partly raised when desired to pour out the contents of the vessel or a remainder thereof through the spout without straining.

Having thus described my invention, what I claim as new, and desire to secure by Letters Patent, is—

1. In combination with a vessel having a rim, a detachable strainer having a coiled handle adapted to be sprung over the vessel-rim and fitting it both on its inside and outside.

2. In combination with a vessel having a rim, a detachable strainer having a frame and an outwardly-extending handle integral with the frame, said handle consisting of a coil of metal adapted to be sprung over the vessel-rim, said vessel-rim being inset, and a cover having a cut-away portion adjacent the said rim inset.

3. In combination with a vessel having a rim, a detachable strainer having a frame and an outwardly-extending handle integral with the frame, said handle consisting of a coil of metal adapted to be sprung over the vessel-rim and engage it on the outside, said rim being inset, and a cover with the rim notched to fit over the coil, said coil being situated in the inset and within the lower proximate circumference of the vessel.

In testimony whereof I have signed this specification in the presence of two subscribing witnesses.

ANTONIO SIDOTI.

Witnesses:
F. W. ANGEL,
D. M. CLARK.